United States Patent Office 2,753,289
Patented July 3, 1956

2,753,289

PROCESS FOR THE MICROBIOLOGICAL SYNTHESIS OF VITAMIN B12 ACTIVE SUBSTANCES

Abraham Leviton, Washington, D. C., assignor to the United States of America as represented by the Secretary of Agriculture No Drawing. Application January 16, 1953,
Serial No. 331,754

(Granted under Title 35, U. S. Code (1952), sec. 266)

5 Claims. (Cl. 195—42)

A non-exclusive, irrevocable, royalty-free license in the invention herein described, for all governmental purposes, throughout the world, with the power to grant sublicenses for such purposes, is hereby granted to the Government of the United States of America.

This invention relates to an improved method for the production of vitamin $B_{12}$ active substances. Bacteria of the genus Propionibacterium produce industrially significant quantities of such materials. One method for the production of fermentation liquors containing vitamin $B_{12}$ active substances in the propionic acid fermentation of nutrient mashes has been claimed in patent application Serial No. 244,686, filed August 31, 1951, by R. E. Hargrove and Abraham Leviton.

The present invention has as its object an improved method for the production of vitamin $B_{12}$ active substances in increased yields in the fermentation of nutrient mashes with propionic acid bacteria, particularly in the fermentation of lactose-containing media with *P. freudenreichii*, an exceptionally productive species.

In the fermentation of nutrient mashes with propionic acid bacteria it has been considered advantageous, in order to increase the rate of fermentation, to grow these bacteria in symbiosis with lactic acid bacteria. In the fermentation of lactose-containing media with *P. freudenreichii*, a more urgent reason for the use of the symbiotic relationship prevails because lactose is not dissimilated by organisms of the species, *P. freudenreichii*. In mixed culture with lactic acid organisms the propionic acid organism dissimilates the lactic acid produced from lactose by the lactic acid organism and a normal fermentation is obtained with respect to the production of propionic, acetic, and carbonic acids.

It has now been discovered that if the fermentation is carried out with *L. casei* as one of the symbionts, the optimum conditions for the production, respectively, of the volatile acids and of vitamin $B_{12}$ active substances do not coincide. The metabolic activities associated with the synthesis of vitamin $B_{12}$ active substances continue for some time after the activities associated with the formation of volatile acids and cell growth come to a halt. Thus, by the extension of the time required normally for a propionic acid fermentation, a four-to-five-fold increase in yield of vitamin $B_{12}$ active substances may be obtained. The end of the normal propionic acid fermentation is recognized by those skilled in the art to coincide with the complete conversion of the metabolizable substrate (in this instance, lactic acid) into the volatile acids propionic, acetic, and carbonic. The course of the normal fermentation periods is thus easily followed by measurement of volatile acids and substrate concentration.

The following example will specifically illustrate the above-described invention, but it is not intended in any way to limit or restrict it:

*Example*

2.5 liters of medium were prepared to contain per liter: 40 g. clarified whey powder (80% lactose), 15 g. N-Z-amine type A (a pancreatic digest of casein), 20 g. calcium carbonate, and 10 mg. manganese sulfate. After the medium minus the carbonate had been sterilized one-half hour at 120° C. and cooled to 30° C., it was inoculated with 100 ml. of a light (0.2% acid) culture of *L. casei* (ATCC 7469) in clarified whey, and the carbonate was added. Following incubation with stirring at 30° C. for 28 hours, 215 ml. of a 28-hour inoculum of *P. freudenreichii* were added, as well as 12 mg. of cobalt chloride hexahydrate. The inoculum had been cultivated in a medium containing 1% lactic acid as sodium lactate, 3% yeast extract, and 0.2% N-Z-amine, and at the time of inoculation contained one gram of dry cells per liter.

The fermentation consists of three phases, in the first of which only the lactobacilli are active, in the second of which the theoretical yield of volatile acids is obtained, and in the third of which the major portion of vitamin $B_{12}$ active substances is produced. Although available to the propionic acid bacteria, lactic acid was not dissimilated until all of the lactose had been converted to lactic acid; then with uncharacteristic suddenness for such high lactate levels, the greater part of the lactic acid was consumed during the next 24 hours. Both cell growth and the dissimilation process come to a halt within a second 24 hour period, but not the synthesis of vitamin $B_{12}$ active substances. During the normal propionic acid fermentation period 0.5 mg. per liter of vitamin $B_{12}$ active substances were produced. Following the normal propionic acid fermentation, under the same conditions as during fermentation, a remarkable phenomenon occurred. The vitamin $B_{12}$ activity continued to rise at an increasing rate until at the end of 96 hours of such increase an additional 2.0 mg. per liter of active substances has been produced, despite the cessation of major metabolic activity concerned with cell growth and conversion of lactic acid to volatile acids.

In the above example, the procedure was illustrated by adding the *L. casei* first and then, after a period of incubation, adding the *P. freudenreichii*. However, the process of this invention is not limited to this specific order. The same practical result may be achieved by adding the two organisms to the culture medium simultaneously. Since *L. casei* grows much faster than *P. freudenreichii*, the difference in growth rate has the same effect as adding the *L. casei* first, permitting it to grow, and then adding the *P. freudenreichii*.

I claim:

1. An improved method for producing fermentation liquors containing vitamin $B_{12}$ active substances which comprises growing a mixed culture of an organism of the genus Propionibacterium and an organism of the genus Lactobacillus in a culture medium containing lactose and cobalt chloride; permitting fermentation to continue for a substantially longer time than the normal period required by the Propionibacterium to convert the lactic acid, produced from the lactose by the Lactobacillus, to acetic acid, propionic acid and carbonic acid; and recovering a fermentation liquor containing vitamin $B_{12}$ active substances.

2. An improved method for producing fermentation liquors containing vitamin $B_{12}$ active substances which comprises providing a culture medium containing lactose as one of the ingredients thereof; inoculating said medium with a culture of an organism of the genus Lactobacillus, permitting fermentation to take place for a period sufficient for a substantial portion of the lactose to be converted to lactic acid; then adding a culture of an organism of the genus Propionibacterium and a small amount of cobalt chloride; permitting fermentation to take place whereby the lactic acid is converted to acetic acid, propionic acid, and carbonic acid; permitting the culture medium to stand for a substantially longer period than that required by the Propionibacterium to convert the lactic acid; and recovering a fermentation liquor containing vitamin $B_{12}$ active substances.

3. An improved method for producing fermentation liquors containing vitamin $B_{12}$ active substances which comprises growing a mixed culture of *P. freudenreichii* and *L. casei* in a culture medium containing lactose and cobalt chloride; permitting fermentation to continue for a substantially longer time than the normal period required by the *P. freudenreichii* to convert the lactic acid, produced from the lactose by the *L. casei*, to acetic acid, propionic acid, and carbonic acid; and recovering a fermentation liquor containing vitamin $B_{12}$ active substances.

4. An improved method for producing fermentation liquors containing vitamin $B_{12}$ active substances which comprises providing a culture medium containing lactose as one of the ingredients thereof; inoculating said medium with a culture of *L. casei*, permitting fermentation to take place for a period sufficient for a substantial portion of the lactose to be converted to lactic acid; then adding a culture of *P. freudenreichii* and a small amount of cobalt chloride; permitting fermentation to take place whereby the lactic acid is converted to acetic acid, propionic acid, and carbonic acid; permitting the culture medium to stand for a substantially longer period than that required by the *P. freudenreichii* to convert the lactic acid; and recovering a fermentation liquor containing vitamin $B_{12}$ active substances.

5. An improved method for producing fermentation liquors containing vitamin $B_{12}$ active substances which comprises providing a culture medium containing lactose as one of the ingredients thereof, inoculating said medium with a culture of *L. casei*; incubating with stirring at 30° C. for 28 hours whereby the lactose is converted by the *L. casei* to lactic acid; then adding a 28 hour inoculum of *P. freudenreichii* and cobalt chloride; further incubating for 24 hours, whereby the lactic acid is converted to propionic acid, acetic acid and carbonic acid, and a small amount of vitamin $B_{12}$ is produced; then permitting the culture to stand for a further period of from 72–96 hours after fermentation ceases whereby the concentration of vitamin $B_{12}$ active substances in said culture is increased; and recovering the fermentation liquor containing said vitamin $B_{12}$ active substances.

References Cited in the file of this patent

UNITED STATES PATENTS

| | | |
|---|---|---|
| 1,459,959 | Sherman | June 26, 1923 |
| 2,595,499 | Wood et al. | May 6, 1952 |
| 2,715,602 | Hargrove et al. | Aug. 16, 1955 |

OTHER REFERENCES

Porter: Bacterial Chemistry and Physiology, 1946, Wiley, page 943.

Smith: Nature, April 24, 1948, page 638.

Shaw: Jour. Pharmacy and Pharmacology, I, No. 10, page 695.

Abelcon et al.: Science, Nov. 25, 1949, vol. 110, page 566.

Hall et al.: Proc. 50th Meeting Am. Soc. Bacteriologists, 1950, page 21.

Leviton et al.: Ind. Eng. Chem., vol. 44, No. 11, Nov. 1952, pages 2651–2655.